July 24, 1962     H. KRAUS     3,045,496

SPECIFIC GRAVITY MEASURING DEVICE

Filed June 19, 1959

INVENTOR

Harold Kraus

BY *L. S. Saulsbury*

ATTORNEY

United States Patent Office 3,045,496
Patented July 24, 1962

3,045,496
SPECIFIC GRAVITY MEASURING DEVICE
Harold Kraus, 716 Northumberland Road, Teaneck, N.J.
Filed June 19, 1959, Ser. No. 821,410
4 Claims. (Cl. 73—433)

This invention relates to a specific gravity measuring device or instrument.

It is the principal object of the present invention to provide a specific gravity measuring device which is so constructed that it can be easily carried and be adapted for use in the field for determining the specific gravities of mineral specimens.

It is another object of the invention to provide a specific gravity measuring device with which the measuring can be effected without employing the use of a scale index marks which on the usual hydrometer are difficult to read because of the liquid menicus surrounding the scale of the hydrometer.

It is still another object of the invention to provide a specific gravity measuring instrument with which field size pieces of the specimen may be tested whereby with the large volume displacement more accurate in the determination of the specific gravity will be had.

It is a further object of the invention to provide a specific gravity measuring device which is so shaped and constructed that the surface tension acting upon the device is kept to a minimum when in use.

Other objects of the invention are to provide a specific gravity measuring device, having the above objects in mind, which is of simple construction, inexpensive to manufacture, has a minimum number of parts, easy to operate, small in size, light in weight, compact, of pleasing appearance, efficient and effective in use.

Figure 1:
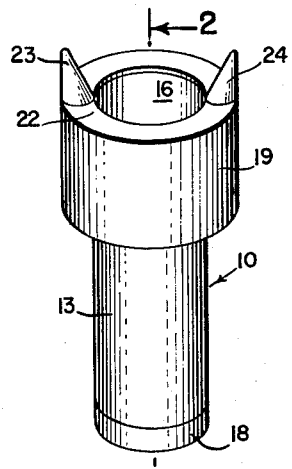
Figure 2:
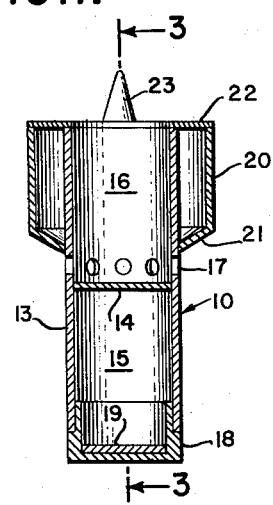
Figure 4:
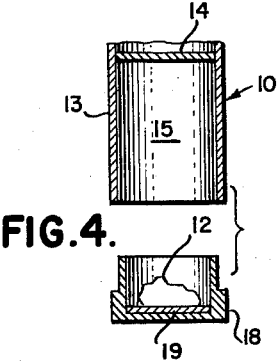
Figure 3:
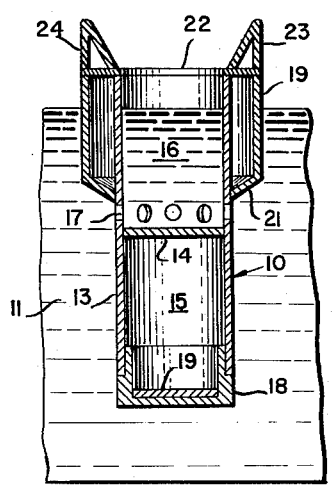
Figure 5:
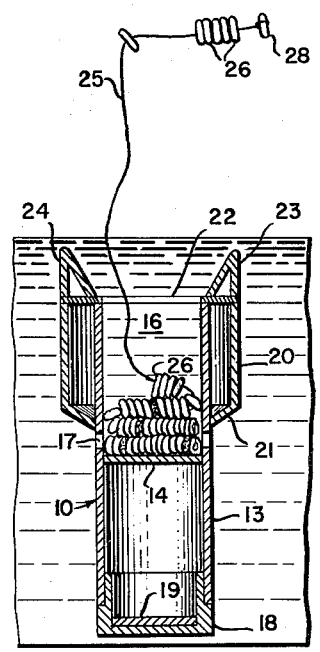
Figure 6:
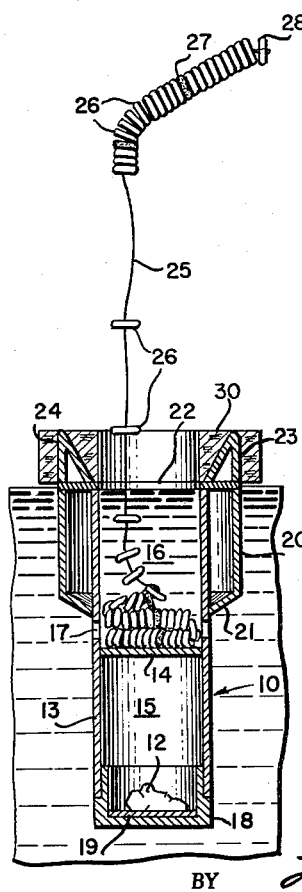
Figure 7:
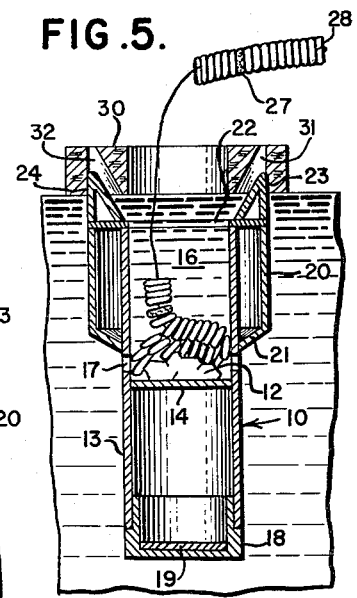

For a better understanding of the invention, reference may be had to the following detailed description taken in connection with the accompanying drawing, in which FIGURE 1 is a front perspective view of the specific gravity testing device embodying the features of the present invention, FIG. 2 is a vertical sectional view of the device as viewed on line 2—2 of FIG. 1, FIG. 3 is a vertical sectional view of the device as viewed on line 3—3 of FIG. 2, FIG. 4 is a fragmentary and similar perspective view with the bottom cap removed and separated from the lower end of the bottom compartment, FIG. 5 is a vertical sectional view similar to FIG. 3 with illustration made as to the manner of determining the weight of the device by itself without the specimen therein and of the weighing element having been dropped into the upper open compartment and the device just after having been submerged from the surface of the liquid and showing the floating weight serving to break the surface tension just released from the device, FIG. 6 is a vertical sectional view in which the specimen has been placed in the bottom compartment free of the liquid, the measuring elements being dropped into the upper compartment and made just ready to break the surface tension and be submerged from the surface of the liquid, and FIG. 7 is a vertical sectional view similar to FIG. 3 of the device with the specimen being located in the open upper compartment and with the measuring elements added and the device made just ready to be submerged from the surface of the liquid.

Referring now to the figures, 10 represents generally the present gravity testing device which is adapted to be floated in water 11 for the purpose of determining the specific gravity of a mineral specimen 12. This device is formed from a vertically-extending sleeve 13 which has a dividing partition 14 to separate the sleeve into a lower water tight compartment 15 and an upper water-receiving compartment 16 into which water may pass through a series of circumferentially-spaced holes 17 at the bottom of the upper compartment 16 and adjacent to the partition 14. In order to close off the lower compartment to prevent the water from entering the same and to provide means on which a specimen 12 can be supported and retained in the compartment 15, is a plastic tight-fitted cap 18 having a ballast plate 19 in the bottom of the same on which the specimen 12 is placed.

In order to give flotation to the device, there is provided an air-tight chamber 20 surrounding the upper end of the sleeve 13 above the holes 17 and closed by a conical bottom 21 and an annular top 22. On the top piece 22 and diagonally spaced from one another are surface tension eliminating horns 23 and 24 which are tapered and along which the liquid may slide allowing the device 10 to be more readily submerged and to run off the surface tension. Other edges of the device can be rounded and tapered to eliminate as much as possible surface tension which tends to prevent ready submersion of the device. Also, a light weight float 30 having openings 31 and 32 for receiving the respective horns 23 and 24 is used to give additional weight to help overcome the surface tension as the device is about to be submerged but which breaks away as shown in FIG. 7 as last weights are applied.

Instead of having a scale from which a reading cannot be readily taken, there is provided a thread or fine wire 25 on which there is slidably disposed sixty (60) small weighing elements 26. Each tenth element being indicated by a different color as indicated at 27. The thread is about one foot in length and the small elements are dropped by gravity along the thread into the upper chamber 16. The ends of the threads each have one of the elements tied into the same against sliding movement as indicated at 28 and which will be included in the count of the weights. A free one half weight element may be used to make a fractional determination.

In use, the device 10 is placed in the body of the water 11 without the specimen 12 being included, FIGS. 3 and 5, to determine the weight of the device by itself as its buoyancy is overcome. Normally the device will float in the water with its upper part lying above the surface as shown in FIG. 3. The weighing elements 26 and 27 are dropped in the manner illustrated in FIG. 5 into the water chamber 16, in sufficient number, a few and one at a time until the device is submerged. For example, it has been found in the particular illustration that fifty-four weighing elements have been required from the string 25 in order for the device to be submerged and break the surface tension of the liquid as shown in FIG. 5. Six weights including the weight 28 remain on the string 25. The weight of the thread is negligible. This is the amount of weights required to submerge the device without the specimen being in the same.

The next step is to carry on a similar operation but with the specimen 12 as shown in FIG. 6 lying in the closed compartment 15 upon the ballast plate 19 in the cap 18. The cap 18 is removed in order to put the specimen 12 inside the compartment 15. The weights 26 and 27 are added to the open chamber 16 and it is found as shown in FIG. 6 that thirty-seven such weights are required to submerge the device with the specimen. The float weight 30 breaks the surface tension and it will float off to indicate that the device has submerged. Twenty-three (23) such weighing elements will be left upon the string. If the numerical difference is taken between the number of elements required to submerge the device as shown in FIG. 5 without the mineral specimen and that required to submerge the device as shown in FIG. 6 with the specimen in the closed compartment, this amount will indicate the weight of the specimen 12 alone independent of its volume. This difference between the fifty-four (54) elements used in the submerging of the device alone as in FIG. 5 and the thirty-seven (37) required for submerging the device with the specimen in the closed compartment amounted to seventeen (17) which is the weight of the specimen independent of volume.

In FIG. 7, the mineral specimen 12 is placed in the open compartment 16 and upon the partition 14. In the same manner the elements 26 and 27 are added to the open chamber 16 and upon the specimen 12 and this is done until the device 10 has become finally submerged and the horns 23 and 24 are broken through the surface of the water and the weight 30 has floated. It is found with this operation that forty-four weighing elements were required to submerge the device and that sixteen such elements remained on the upper end of the string 25 and outside of the compartment 16. If the difference between the weighing of the specimen as shown in FIG. 6 (37) in the closed compartment 15 and the weight as determined in FIG. 7, (44) where the specimen is in the open water compartment is taken, the amount will equal to seven which is the weight of the volume of water required to displace the specimen 12. Having now the weight of the specimen and the weight of the volume of water displaced, the weight of the specimen divided by the weight of the volume of water (7) will give about 2.5 which will be the specific gravity of the specimen being tested. From mineral tables the specific gravity of the certain materials will be given and having once determined this specific gravity one can by this means refer to the tables and determine what minerals approximate this specific gravity and what the mineral may be.

It will be apparent that scales and a hydrometer have been unnecessary in determining the specific gravity of the mineral. It will be seen that the weighing elements are confined to a string and can be easily directed into the open water compartment and removed as a unit. This string has been provided for keeping control of the sixty measuring elements. The device is preferably made of hard plastic material and the bottom cap is preferably made of soft plastic material so that it can have sealing engagement with the lower end of the sleeve 13 to close off the compartment 15. By means of the ballast 19 the device is kept upright in the water.

While various changes may be made in the detailed construction, it shall be understood that such changes shall be within the spirit and scope of the present invention as defined by the appended claims.

What is claimed is:

1. A specific gravity measuring device for mineral specimens and for use with water comprising a normally buoyant body divided into lower and upper compartments formed by a sleeve and an air tight chamber so that the body is normally buoyant, removable closure means on the sleeve to provide access to the lower compartment, both of said compartments adapted to receive a mineral specimen, said upper compartment having side openings near the bottom thereof so that the water may be extended thereinto and being open at the top, the upper compartment being open at the top and adapted to receive weighing elements to cause its submersion into the water to thus indicate and determine the weight of the specimen by the number of elements utilized before and after the mineral specimen is placed in the lower compartment.

2. A specific gravity measuring device as defined in claim 1, and said closure means comprising a tight-fitting removable cap having ballast disposed therein to help keep the device righted in the water.

3. A specific gravity measuring device as defined in claim 1, and horn projections extending upwardly from the upper end of the device to break the surface tension in the water.

4. A specific gravity measuring device as defined in claim 1, and a floatable weight carried on the top of the body to provide added weight to break through the surface tension of the water and releasable therefrom as the body submerges.

References Cited in the file of this patent
UNITED STATES PATENTS

| | | |
|---|---|---|
| 701,273 | Osgood | May 27, 1902 |
| 977,513 | Coe | Dec. 6, 1910 |
| 1,272,605 | Becker | July 16, 1918 |
| 2,037,328 | Huberti et al. | Apr. 14, 1936 |
| 2,506,973 | Segal | May 9, 1950 |